United States Patent [19]

Harbach et al.

[11] Patent Number: 4,800,143

[45] Date of Patent: Jan. 24, 1989

[54] HIGH-TEMPERATURE STORAGE BATTERY

[75] Inventors: Friedrich Harbach, Heidelberg; Reinhard Knödler, Nussloch; Rudolf Krapf; Stefan Mennicke, both of Leimen; Ludwig Weiler, Heidelberg, all of Fed. Rep. of Germany

[73] Assignee: BBC Brown, Boveri Aktiengesellschaft, Mannheim-Käfertal, Fed. Rep. of Germany

[21] Appl. No.: 126,738

[22] Filed: Nov. 30, 1987

[30] Foreign Application Priority Data

Nov. 28, 1986 [DE] Fed. Rep. of Germany ....... 3640749

[51] Int. Cl.[4] .......................... H01M 6/46; H01M 2/08
[52] U.S. Cl. .................................... 429/153; 429/104; 429/172
[58] Field of Search ................. 429/66, 103, 104, 172, 429/153

[56] References Cited

U.S. PATENT DOCUMENTS

| 3,475,220 | 10/1969 | Knorr | 429/153 X |
| 3,488,221 | 1/1970 | Shumotake et al. | 429/103 |
| 3,783,024 | 1/1974 | Gibson et al. | 429/66 |
| 3,895,959 | 7/1975 | Dehmelt | 429/172 X |
| 4,013,818 | 3/1977 | Askew et al. | 429/153 X |
| 4,414,299 | 11/1983 | Ansell | 429/104 |
| 4,419,419 | 12/1983 | Knödler | 429/104 |
| 4,510,217 | 4/1985 | Kagawa et al. | 429/104 |

Primary Examiner—Stephen J. Kalafut
Attorney, Agent, or Firm—Herbert L. Lerner; Laurence A. Greenberg

[57] ABSTRACT

A high-temperature storage battery includes a housing and a stack of at least two storage cells disposed in the housing. Each of the storage cells has components loosely disposed on top of one another in the stack. The components include two reactant chambers, a planar ion-conducting solid electrolyte mutually separating the reactant chambers, and planar components serving as electrodes and bordering the storage cells toward the outside. At least one common resilient structural element presses the components of all of the storage cells together in a leakproof manner.

10 Claims, 1 Drawing Sheet

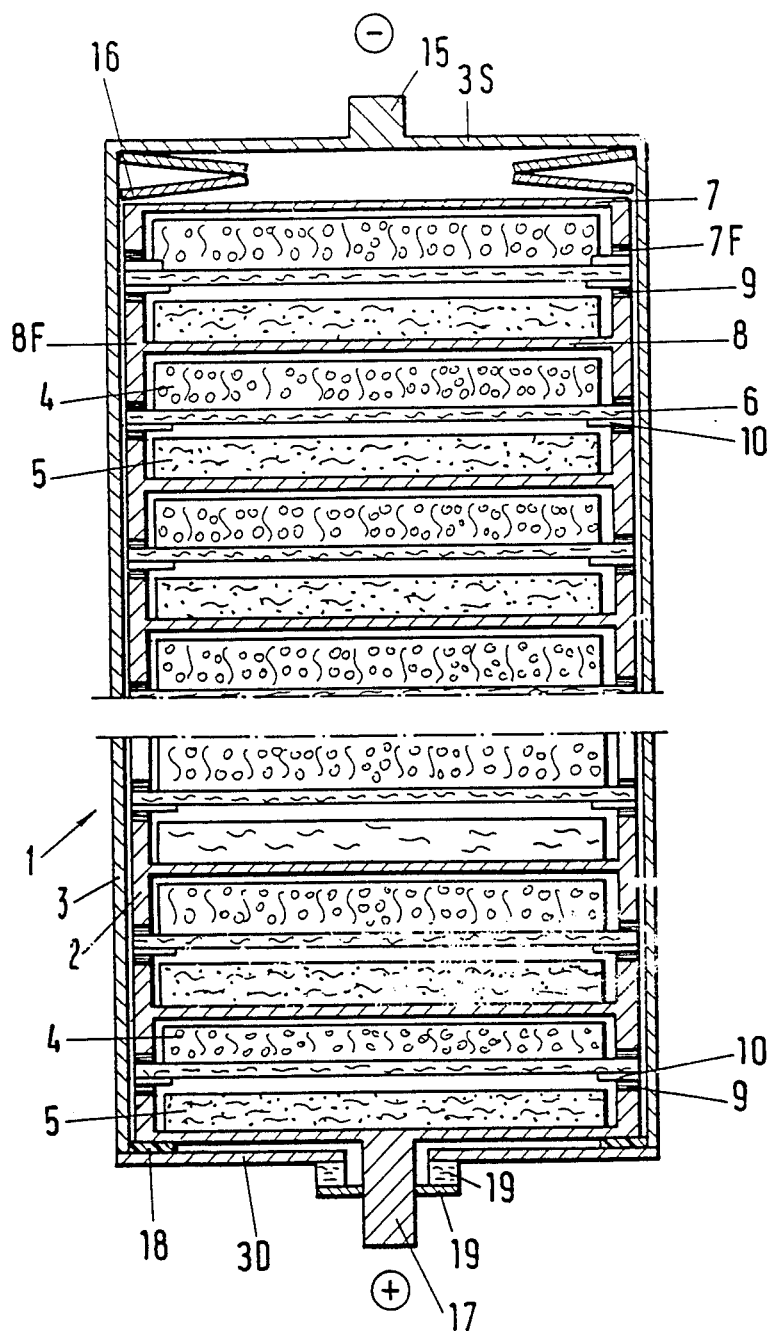

HIGH-TEMPERATURE STORAGE BATTERY

The invention relates to a high-temperature storage battery with at least two storage cells each having two reactant spaces or chambers which are separated from one another by means of a planar or sheet-like ion-conducting solid electrolyte and which are bordered or limited on the outside by planar or sheet-like components serving as electrodes.

Such high-temperature storage batteries formed of a plurality of electrochemical storage cells are used increasingly for driving electric vehicles.

German Published, Non-Prosecuted Application DE-OS No. 21 57 939 discloses a high-temperature storage battery formed of a plurality of plate-shaped electrochemical storage cells. The cells are stacked on top of one another, in such a way that the cathode space or chamber of one storage cell is adjacent the anode space or chamber of the next storage cell and these two reactant spaces or chambers adjacent one another have a common electrode. The electrode simultaneously serves to limit or border the two storage cells. The stack of storage cells is braced between aluminum disks which are held together by means of steel bolts and steel nuts.

A disadvantage of such a high-temperature storage battery is that the storage cells and the battery as a whole are not adequately sealed. In that construction of the high-temperature storage battery, there is still the possibility that the reactants will leak out, thus resulting in damage to the high-temperature storage battery.

It is accordingly an object of the invention to provide a high-temperature storage battery, which overcomes the hereinafore-mentioned disadvantages of the heretofore-known devices of this general type.

With the foregoing and other objects in view there is provided, in accordance with the invention, a high-temperature storage battery, comprising a housing; a stack of at least two storage cells disposed in the housing; each of the storage cells having components loosely disposed on top of one another in the stack the components including two reactant chambers or spaces, a planar or sheet-like ion-conducting solid electrolyte mutually separating the reactant chambers, and planar or sheet-like components serving as electrodes and bordering the storage cells toward the outside; and at least one common resilient structural element pressing the components of all of the storage cells together in a leakproof manner.

Since a plurality of plate-shaped storage cells are disposed in a stack according to the invention, it is possible to produce a high-temperature storage battery which can receive more storage cells with a higher energy density than known devices formed of cylindrical storage cells, while having the same volume as in the prior art. The storage cells which are used are hermetically sealed off from one another and from the outside in such a way that the reactants are completely prevented from leaking out. Since the storage cells which are joined together in a stack are additionally limited or bordered toward the outside by a housing which is common to all of the storage cells, the best possible sealing of the high-temperature storage battery is guaranteed. In addition, the housing can be evacuated or filled with an inert gas. The required pressure can always be kept constant by means of the additional resilient components inside the housing.

In accordance with another feature of the invention, the housing has an end surface and a cover, each of the reactant chambers in the vicinity of the end surface and of the cover being bordered toward the outside by a respective one of the planar components serving as an electrode, each of the one planar components serving as electrodes being in the form of a plate having flanges extending to one of the solid electrolytes bordering the reactant chambers.

In accordance with a further feature of the invention, the reactant chambers of each of the storage cells are in the form of an anode chamber and a cathode chamber, the storage cells being disposed in the stack with the anode chamber of a given storage cell adjacent the cathode chamber of the storage cell adjacent the given storage cell, and the reactant chambers being bordered by the other of the planar components serving as electrodes, each of the other planar components serving as electrodes being a common electrode in the form of a plate having a double flange extending to one of the solid electrolytes of the respective storage cell.

In accordance with an added feature of the invention, there are provided sealing means and insulation disposed between each of the flanges and each respective solid electrolyte.

In accordance with an additional feature of the invention, the storage cells have bases, and the housing is in the form of a container being closed on one side thereof and having a base with the same shape as the bases of the storage cells.

In accordance with yet another feature of the invention, the housing is in the form of a container being closed on one side thereof at the end surface, and the resilient structural element is disposed between the closed end surface of the housing and one of the one planar components serving as electrodes.

In accordance with yet a further feature of the invention, the housing is in the form of a container having a closed side at the end surface and having a remaining inner surface, the closed end surface of the housing and the one planar component adjacent the closed end surface are connected to one another in an electrically conductive manner, and the housing is insulated over all of the remaining inner surface.

In accordance with yet an additional feature of the invention, the end surface of the housing is closed and is disposed at a first end of the housing and the cover is disposed at a second end of the housing, and the housing includes a first outward-pointing current collector in the vicinity of the closed end, and a second bar-shaped current collector fastened to the one planar component serving as an electrode adjacent the cover, and the bar-shaped current collector is guided outwardly in an insulated manner through the cover.

In accordance with yet an added feature of the invention, the housing and the components serving as electrodes are formed of a material with good electrical conductivity.

In accordance with a concomitant feature of the invention, the solid electrolyte is formed of a material from the group consisting of beta aluminum oxide, porous magnesium oxide and boron nitride, the anode chamber is filled with a material from the group consisting of sodium and lithium, the cathode chamber contains a material from the group consisting of sulfur and iron sulfide, the resilient structural element is in the form of a cup spring made of an electrically conductive material, and the housing is evacuated or filled with a protective gas.

Other features which are considered as characteristic for the invention are set forth in the appended claims.

Although the invention is illustrated and described herein as embodied in a high-temperature storage battery, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the drawing.

The single FIGURE of the drawing is a diagrammatic, vertical-sectional view of a high-temperature storage battery.

Referring now to the FIGURE of the drawing in detail, there is seen a high-temperature storage battery 1 formed essentially of a plurality of disk or plate-shaped rechargeable storage cells 2 and a housing 3. The housing is cylindrical and is closed at least at one end surface 3S thereof. The base of the housing 3 and the bases of the storage cells 2 have the same shape. In the illustrated embodiment, the storage cells 2 and the housing 3 each have a round base. It is also possible, if necessary, to make the bases polygonal or elliptical. Inside each storage cell 2 are two reactant spaces or chambers 4 and 5, specifically an anode space or chamber 4 and a cathode space or chamber 5. The spaces 4, 5 are separated from one another by means of a planar or sheet-like solid electrolyte 6 in the form of a plate. The dimensions of the solid electrolyte 6 are selected in such a way that the outside diameter thereof is a few millimeters larger than the inside diameter of the two reactant spaces or chambers 4 and 5.

The two reactant spaces or chambers 4 and 5 of each storage cell 2 are bordered toward the outside, specifically toward the housing 3 and toward the particular storage cells 2 adjacent them, by means of a planar or sheet or plate-shaped component 7, 8. The edge region of the plate-shaped component 7, 8 is equipped with an all-round flange 7F, 8F. Each of the components 7 acquires a U-shaped cross-section, as a result of the flange 7F thereof. The flange 8F is disposed on both sides of the surfaces of all of the components 8. Consequently, all of the components 8 have an I-shaped cross-section. The outside diameters of the components 7 and 8 are selected in such a way that they are slightly smaller than the inside diameter of the housing 3 with the result that they are still just able to be inserted into the housing. The height of the flanges 7F is selected in such a way that they completely limit each reactant space or chamber 4, 5 toward the lateral surfaces of the housing 3. The components 7 are used merely to limit the two outermost reactant spaces or chambers 4 and 5 which are respectively disposed opposite the end surface 3S and a cover 3D of the housing 3.

As can be seen by reference to the drawing, as a result of the placement of the storage cells 2 in the illustrated embodiment, the anode space or chamber 4 and a cathode space or chamber 5 of every two adjacent storage cells 2 are directly next to one another. As a result of the components 8, the adjacent reactant spaces or chambers 4 and 5 of every two storage cells 2 which are next to one another are bordered by a common component 8.

Due to the placement of the flange 8F which gives the component 8 an I-shaped cross-section, the two adjacent reactant spaces or chambers 4 and 5 are laterally bordered toward the housing 3. The height of the flanges 8F is selected in such a way that the two reactant spaces or chambers 4 and 5 are completely closed laterally.

Besides the components 4–8, the storage cells 2 also include another component in the form of sealing means 9 which are disposed between each solid electrolyte 6 and each flange 7F or 8F. In the illustrated embodiment, the sealing means are in the form of a ring. In the vicinity of the flanges 7F or 8F, the solid electrolyte 6 is additionally provided with an insulating layer 10 formed of glass or glass ceramic. The insulating layer 10 extends over the entire extent or reach of each sealing means 9 and as illustrated, the insulating layer 10 is also somewhat wider than the sealing means 9, while the width of the sealing means 9 is matched to the width of the flanges 7F and 8F.

In order to construct a high-temperature storage battery, the storage cells 2 are placed one above the other in the above-described manner to form a stack and they are delimited from one another. The number of storage cells 2 which are used depends on the size of the housing 3. A housing 3 of a corresponding size must be chosen for a predetermined number of storage cells 2. The housing 3 at the same time serves as a negative electrical junction pole for the storage cells 2 disposed therein. In the illustrated embodiment, the inner surfaces of the housing 3 are for the most part insulated relative to the storage cells 2, and for this purpose the inner surfaces of the housing 3 are coated with a non-illustrated insulating layer. It is only in the vicinity of the anode space or chamber 4 located directly opposite the end surface 3S of the housing 3, that the inner surface is not insulated. At that location, the inner surface is in electrically conductive contact with the component 7 which borders the anode space or chamber 4.

An outwardly-directed electrical current collector 15 which is disposed in the vicinity of the end surface 3S of the housing 3, is connected to the housing 3, specifially to the end surface 3S, in an electrically conductive manner. In order to ensure that the storage cells 2 which are stacked on top of one another are held together with the necessary pressure, at least one resilient structural element or component 16 is located inside the housing 3, specifically between the end surface 3S and the first anode space or chamber 4. This ensures that the storage cells 2 disposed between the end surface 3S and the cover 3D are pressed together so as to be leak-proof. In the illustrated embodiment, the resilient structural element 16 is in the form of a cup spring. A different structural element or component which also possesses resilient properties can also be used instead of a cup spring. Therefore, an expandable structural element or component filled with sodium can also be employed.

A positive current collector 17 is provided in the form of a bar-shaped electrically conductive structural element or component, which is connected to the cathode space or chamber 5 opposite the cover 3D of the housing 3. According to the invention, the positive current collector 17 is connected to the component 7 which borders the cathode space or chamber 5 toward the outside, in an electrically conductive manner. An insulating ring 18 is located between the component 7 and the cover 3D. The positive current collector 17 is guided through the cover 3D and projects outwardly a few millimeters beyond the cover 3D. An insulating ring 19 which is disposed between the current collector 17 and the cover 3D, simultaneously serves as a retaining element for the bar-shaped current collector 17.

The foregoing is a description corresponding in substance to German Application No. P 36 40 749.6, dated Nov. 28, 1986, the International priority of which is being claimed for the instant application, and which is hereby made part of this application. Any material discrepancies between the foregoing specification and the aforementioned corresponding German application are to be resolved in favor of the latter.

We claim:

1. High-temperature storage battery, comprising a housing; a stack of storage cells disposed in said housing; each of said storage cells having flat components loosely disposed on top of one another in said stack; said components including an anode reactant chamber and a cathode reactant chamber, a planar ion-conducting solid electrolyte mutually separating said anode and cathode reactant chambers, and planar components each being in the form of a plate having flanges each extending to one of said solid electrolytes, said planar components serving as electrodes and bordering said anode chamber and said cathode chamber of two adjacent storage cells toward the outside; and at least one common resilient structural element pressing said components of all of said storage cells together in a leak-proof manner.

2. High-temperature storage battery according to claim 1, including sealing means and insulation disposed between each of said flanges and each respective solid electrolyte.

3. High-temperature storage battery according to claim 1, wherein said storage cells have bases, and said housing is in the form of a container being closed on one side thereof and having a base with the same shape as said bases of said storage cells.

4. High-temperature storage battery according to claim 1, wherein said housing has an end surface, said housing is in the form of a container being closed on one side thereof at said end surface, and said resilient structural element is disposed between said closed end surface of said housing and one of said one planar components serving as electrodes.

5. High-temperature storage battery according to claim 1, wherein said housing has an end surface, said reactant chamber in the vicinity of said end surface is bordered toward the outside by one of said planar components serving as an electrode, said housing is in the form of a container having a closed side at said end surface and having a remaining inner surface, said closed end surface of said housing and said one planar component adjacent said closed end surface are connected to one another in an electrically conductive manner, and said housing is insulated over all of said remaining inner surface.

6. High-temperature storage battery according to claim 1, wherein said housing has a first closed end, a second open end, a cover closing said second open end, a first outward-pointing current collector in the vicinity of said closed end, and a second bar-shaped current collector fastened to one of said planar components serving as electrodes adjacent said cover, and said bar-shaped current collector is guided outwardly in an insulated manner through said cover.

7. High-temperature storage battery according to claim 1, wherein said housing has an end surface and a cover, each of said reactant chambers in the vicinity of said end surface and of said cover being bordered toward the outside by a respective one of said planar components serving as an electrode, said end surface of said housing is closed and is disposed at a first end of said housing and said cover is disposed at a second end of said housing, and said housing includes a first outward-pointing current collector in the vicinity of said closed end, and a second bar-shaped current collector fastened to said one planar component serving as an electrode adjacent said cover, and said bar-shaped current collector is guided outwardly in an insulated manner through said cover.

8. High-temperature storage battery according to claim 1, wherein said housing and said components serving as electrodes are formed of a material with good electrical conductivity.

9. High-temperature storage battery according to claim 1, wherein said solid electrolyte is formed of a material from the group consisting of beta aluminum oxide, porous magnesium oxide and boron nitride, said anode chamber is filled with a material from the group consisting of sodium and lithium, said cathode chamber contains a material from the group consisting of sulfur and iron sulfide, said resilient structural element is in the form of a cup spring made of an electrically conductive material, and said housing is evacuated.

10. High-temperature storage battery according to claim 1, wherein said solid electrolyte is formed of a material from the group consisting of beta aluminum oxide, porous magnesium oxide and boron nitride, said anode chamber is filled with a material from the group consisting of sodium and lithium, said cathode chamber contains a material from the group consisting of sulfur and iron sulfide, said resilient structural element is in the form of a cup spring made of an electrically conductive material, and said housing is filled with an inert gas.

* * * * *